US 8,763,565 B2

(12) United States Patent
Dunn et al.

(10) Patent No.: US 8,763,565 B2
(45) Date of Patent: Jul. 1, 2014

(54) TWO ENGINE SYSTEM WITH A GASEOUS FUEL STORED IN LIQUEFIED FORM (71) Applicant: Westport Power Inc., Vancouver (CA)

(72) Inventors: Mark E. Dunn, Vancouver (CA); Valerie N. LeBlanc, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 13/853,761

(22) Filed: Mar. 29, 2013

(65) Prior Publication Data
US 2013/0228151 A1   Sep. 5, 2013

Related U.S. Application Data (63) Continuation of application No. PCT/CA2011/050518, filed on Aug. 25, 2011.

(30) Foreign Application Priority Data

Oct. 1, 2010   (CA) .................................... 2716283

(51) Int. Cl.
F02M 21/02   (2006.01)

(52) U.S. Cl.
USPC ....................................... 123/27 GE; 123/525

(58) Field of Classification Search
USPC ............. 123/27 GE, 525–527, 698, 516, 518
See application file for complete search history.

(56) References Cited

U.S. PATENT DOCUMENTS

| 4,177,017 A | 12/1979 | Schultz |
| 4,809,666 A * | 3/1989 | Baltz .............................. 123/516 |
| 5,315,831 A | 5/1994 | Goode et al. |
| 5,411,374 A | 5/1995 | Gram |
| 5,884,488 A | 3/1999 | Gram et al. |
| 6,253,742 B1 * | 7/2001 | Wickman et al. .............. 123/516 |
| 6,581,580 B2 * | 6/2003 | Trumpy et al. ................. 123/519 |
| 7,144,228 B2 | 12/2006 | Emmer et al. |
| 7,293,418 B2 | 11/2007 | Noble et al. |
| 7,533,634 B2 * | 5/2009 | Ritter et al. ............... 123/27 GE |
| 2003/0221433 A1 | 12/2003 | Gustafson |

(Continued)

FOREIGN PATENT DOCUMENTS

| DE | 19533863 A | 3/1997 |
| JP | 1988302169 A | 12/1988 |

(Continued)

OTHER PUBLICATIONS

International Search Report and Written Opinion issued on Oct. 13, 2011, in connection with International Application No. PCT/CA2011/050518.

(Continued)

Primary Examiner — John Kwon
(74) Attorney, Agent, or Firm — Corridor Law Group, P.C.

(57) ABSTRACT

A gaseous fuelled two-engine system comprises a high pressure direct injection engine as the main power source and an auxiliary fumigated engine that can be fuelled with vapor removed from a storage tank that stores the gaseous fuel in liquefied form at cryogenic temperatures. The fuel supply system comprises a cryogenic pump for raising the pressure of the fuel to the injection pressure needed for the high pressure direct injection engine, and the cryogenic pump is powered by the auxiliary fumigated engine.

20 Claims, 3 Drawing Sheets

(56) References Cited

U.S. PATENT DOCUMENTS

| | | |
|---|---|---|
| 2004/0211192 A1 | 10/2004 | Lechner |
| 2006/0005895 A1 | 1/2006 | Gram et al. |
| 2009/0215328 A1 | 8/2009 | Daffey |
| 2010/0089072 A1 | 4/2010 | Lee et al. |

FOREIGN PATENT DOCUMENTS

| | | |
|---|---|---|
| JP | 1989138358 A | 5/1989 |
| JP | 1989172700 A | 7/1989 |
| JP | 2004051050 A | 2/2004 |
| JP | 2006029157 A | 2/2006 |
| JP | 2009062982 A | 3/2009 |
| KR | 20040046836 A | 6/2004 |
| WO | 2006021076 A1 | 3/2006 |

OTHER PUBLICATIONS

Office Action issued by the Canadian Intellectual Property Office on Jan. 31, 2012, in connection with underlying Canadian patent application No. 2,716,283.

International Preliminary Report on Patentability issued on Nov. 5, 2012, in connection with International Application No. PCT/CA2011/050518.

\* cited by examiner

TWO ENGINE SYSTEM WITH A GASEOUS FUEL STORED IN LIQUEFIED FORM

CROSS-REFERENCE TO RELATED APPLICATION(S)

This application is a continuation of International Application No. PCT/CA2011/050518, having an international filing date of Aug. 25, 2011, entitled "Two Engine System With A Gaseous Fuel Stored In Liquefied Form". The '518 international application claimed priority benefits, in turn, from Canadian Patent Application No. 2,716,283 filed Oct. 1, 2010, also entitled "Two Engine System With a Gaseous Fuel Stored in Liquefied Form". The '518 international application is hereby incorporated by reference herein in its entirety.

FIELD OF THE INVENTION

The present invention relates to a two-engine system with a gaseous fuel stored in liquefied form. In one particular embodiment, the gaseous fuel is natural gas which is stored on board a vehicle in liquefied form at cryogenic temperatures. The present invention also relates to a method and apparatus for preventing the release of boil-off gas into the atmosphere.

BACKGROUND OF THE INVENTION

Internal combustion engines have been used to produce power and drive machines for over a century. Historically, gasoline and diesel have been preferred fuel choices because they were abundant, inexpensive, and easy to store. While natural gas has been used as a fuel for vehicles for over fifty years, widespread use has been curtailed for various reasons including fuel storage density, infrastructure, availability of fuel, and capital costs that are generally higher compared to conventional liquid-fuelled vehicles. However, alternative fuel choices are receiving renewed attention because of several factors, including changing economic conditions, the desire to reduce pollution, and the desire to reduce dependency on diminishing and increasingly expensive oil resources.

There are numerous advantages to substituting liquid fuels with natural gas or other gaseous fuels that are combustible in an internal combustion engine and which are in the gaseous phase at atmospheric pressure and temperature. Natural gas is itself a mixture of combustible gases, but it is primarily methane. Other gaseous fuels include ethane, propane, and other lighter flammable hydrocarbon derivatives as well as hydrogen and mixtures thereof. For example, mixtures of hydrogen and natural gas have been used as a fuel for internal combustion engines, and such mixtures are sometimes referred to as "HCNG". Compared to conventional liquid fuels, the gaseous fuels described herein are generally cleaner burning and can be produced from renewable sources. Natural gas is one of the most abundant gaseous fuels available today and in the examples described herein, natural gas is named as the fuel but suitable gaseous fuels that are combustible could also be employed in the internal combustion engines described herein.

In the past, most natural gas fuelled vehicles ("NGV") were naturally fumigated, that is, natural gas was not introduced into the cylinders directly, but rather by being injected into the intake manifold, where the fuel mixed with the intake air and was fed into the cylinders with the intake air, entering through the intake port and open intake valves. Compared to engines that inject the fuel directly into the combustion chamber late during the compression stroke, the injection pressure needed to overcome the pressure in the intake manifold is relatively low. Accordingly, the fuel supply system for a naturally fumigated NGV is relatively simple. Fuel is held in and supplied from a liquefied natural gas (LNG) storage tank with a working pressure just above the engine inlet pressure, or from compressed natural gas ("CNG") cylinders through pressure regulators which reduce the pressure to the desired injection pressure. CNG is commonly stored at ambient temperatures at pressures up to 250 bar, but a disadvantage of CNG is its lower energy density compared to conventional liquid fuels or LNG and the relatively heavy weight normally associated with CNG storage tanks, which need to be designed to withstand the high storage pressures.

On the other hand, LNG is normally stored at temperatures of between about −160° C. and −130° C. and at lower pressures compared to CNG, for example, less than 10 bar and typically between about 2 and 8 bar, with an energy density that is about four times higher than that of CNG. LNG storage tanks provide an acceptable means for storing a sufficient volume of natural gas on board NGVs. However, using LNG as a fuel supply introduces some complications in the fuel handling and supply systems. One complication is that the liquefied natural gas must be warmed and converted into gaseous form before being supplied to the engine. Also, to store such fuel in liquefied form it must be kept at cryogenic temperatures, requiring the storage tank to be thermally insulated to reduce heat transfer into the storage space. However, because cryogenic storage tanks require structural elements and pipes for filling and dispensing the fuel, there is at least some amount of heat transfer into the storage space, and when heat is absorbed by the stored liquefied gas, some of it can be converted to vapor which has a lower density than the liquefied gas, causing an increase in the storage pressure. This vapor is known as boil-off gas ("BOG") and it needs to be re-liquefied or removed from the storage space to prevent the storage pressure from rising above the pressure limits of the storage tank. Some fumigated engines can take the BOG and inject it into the intake manifold or intake ports if the pressure of the BOG is higher than the intake air pressure.

Newer, more efficient engines for NGVs, referred to herein as high pressure direct injection ("HPDI") engines, have been developed that inject the gaseous fuel at high pressure, late in the compression stroke to emulate the performance and efficiency of a diesel engine. The fuel injection pressure for HPDI engines is typically at least 200 bar. To raise the pressure of the stored liquefied gas from storage pressure to at least 200 bar a cryogenic pump is normally used. A suitable drive is required to drive the cryogenic pump in these pressure boosting systems. In vehicle applications, the drives are typically powered by an electric motor or hydraulically with power being transmitted through a working fluid to the pump drive. The hydraulic power in the latter case is typically derived from the vehicle engine which is itself being supplied with natural gas fuel originating from the LNG storage tank.

Because of the high injection pressures needed for HPDI engines, such engines are unable to use the BOG vented from the storage tank because the BOG pressure is too low and it is not efficient and therefore not practical to compress the vapor to the high pressures needed for direct injection into the combustion chamber. For HPDI engines, several approaches have been applied to reduce the amount of BOG, including reducing heat transfer into the storage tank, designing pumps that can pump both vapor and liquefied gas as disclosed in co-owned U.S. Pat. No. 5,884,488, introducing the BOG into the engine's intake manifold to offset some of the fuel that is injected directly into the combustion chambers, and by burning the BOG in a heater or some other non-engine apparatus. With some of these approaches there can still be times when a small amount of BOG cannot be directed to useful applications, resulting in the BOG being vented from the storage tank. There is a need to prevent the venting of BOG because this represents waste, while also posing emissions and safety concerns.

SUMMARY OF THE INVENTION

For vehicles that use an HPDI engine that is fuelled with a gaseous fuel that is stored in liquefied form, it can be advantageous to employ a separate, auxiliary fumigated internal combustion engine, for example to provide the mechanical drive for a cryogenic fuel pump or other components in the fuel supply system. Whereas the main HPDI engine requires high pressure gas, the auxiliary fumigated engine can be fueled with the BOG. The efficiency of fumigated engines is generally lower than that of HPDI engines, but this can be acceptable if the auxiliary engine is much smaller than the main engine and the auxiliary engine provides a useful application for the BOG. That is, the overall efficiency of the entire vehicle can still be high because most of the power requirements are met by the main HPDI engine and no BOG is wasted. In addition, the auxiliary engine can replace a more complicated and maintenance-prone hydraulic system, resulting in overall system simplification and improved reliability.

A gaseous-fuelled two-engine system for such vehicles thus comprises a cryogenic fuel storage tank that is thermally insulated for holding a gaseous fuel in liquefied form. The storage tank has a first outlet associated with a lower portion of the storage tank for delivering gaseous fuel in liquefied form, and a second outlet associated with an upper portion of the storage tank for delivering gaseous fuel in vaporized form. The system also comprises a cryogenic pump comprising a suction inlet fluidly connected to the first outlet of the storage tank, a drive for the cryogenic pump comprising a power supply, and a vaporizer having an inlet fluidly connected to a discharge outlet of the cryogenic pump. Gaseous fuel is directed from a vaporizer outlet to a fuel injector or injectors in a first engine that is a high pressure, direct injection gaseous-fuelled internal combustion engine in which the fuel injectors inject the gaseous fuel directly into a combustion chamber at injection pressures greater than 200 bar, and more preferably at least 250 bar. The vehicle also comprises a second engine that is a fumigated gaseous-fuelled internal combustion engine comprising a fuel injector for injecting gaseous fuel into an intake air manifold that delivers intake air to a combustion chamber of the second engine. The gaseous fuel that is supplied to the second engine can be supplied from the second outlet of the storage tank. The second fumigated engine is the power supply for the cryogenic pump drive In an exemplary use, the system is mounted on a vehicle with the first direct injection engine being a primary source of motive power to the vehicle and thus is sized for motive purposes. A preferred gaseous fuel for use in such a vehicle is natural gas. The second fumigated engine can comprise a throttle in an intake air passage and a spark plug in its combustion chamber to trigger ignition of the gaseous fuel. As mentioned, the second fumigated engine powers the cryogenic pump drive and thus is typically sized for this purpose. In addition however, the second fumigated engine can be the power supply for additional auxiliary devices, such as, by way of example, a water/coolant pump, an air conditioner, refrigeration equipment, hydraulic drives, or an electrical generator. In such other embodiments the auxiliary engine is preferably used to power devices that can be operated when the vehicle is not moving, so that by being driven by the auxiliary engine, it is not necessary to operate the larger direct injection engine, which might not be as efficient for light loads.

The gaseous fuelled two-engine system can additionally comprise an accumulator in fluid communication with the vaporizer outlet for storing vaporized gas that has been pumped to a high pressure by the cryogenic pump. The accumulator serves to reduce pressure fluctuations in the vaporized natural gas.

If the supply of BOG is insufficient to operate the second fumigated engine as desired, the fuel inlet of the fumigated engine can also be fluidly connected to the accumulator and/or to the vaporizer outlet in order to supplement the available BOG. Because this source of fuel is at a relatively high pressure, pressure reduction is typically required with this approach. For example, the system can further comprise a pipe and a pressure reducing valve associated therewith for directing a portion of the gaseous fuel to the second engine from the accumulator or from another point downstream from the vaporizer outlet. Alternatively, the system can comprise a second vaporizer whose inlet is in direct fluid communication with the liquefied fuel in the lower portion of the storage tank and whose outlet is fluidly connected to supply vaporized gaseous fuel to the second engine. The vaporized fuel in this embodiment is at relatively low pressure and with this approach; the fuel can be supplied directly to the second engine without requiring as much pressure reduction, if any.

The cryogenic pump in the fuel supply system can be a reciprocating piston pump. However, the fumigated engine can directly drive the reciprocating piston pump and thus hydraulic lines, reservoirs, and the like are not required. Further, the speed of the fumigated engine can be controlled according to demand from the fuel injected engine.

What would otherwise be waste heat generated from the second fumigated engine can be used to vaporize liquefied gaseous fuel in the vaporizers of the present system. One method employs a coolant subsystem for the auxiliary fumigated engine which includes a cooling circuit in thermal communication with one of the vaporizers. In another method, the second engine is physically located in thermal contact with one of the vaporizers such that heat generated by the second engine is transferred to the vaporizer by conduction.

In a particular embodiment, the present gaseous fuelled two-engine system provides the power for a vehicle and the system comprises a first engine that is a high pressure direct injection internal combustion engine that provides on average at least 90% of the total power output of the system when the vehicle is moving. Because the power output required will change depending upon factors such vehicle load, speed and the resistance to movement such as that caused by the terrain or wind, there are times when the first engine will provide a greater percentage of the power, and other times when the vehicle is coasting when the percentage will be lower. However, on average, the first engine will be the engine that provides most of the power. In this system a second engine that is a fumigated internal combustion engine, provides, on average, no more than about 10% of the total power output of the system. A fuel storage tank stores a gaseous fuel in liquefied form at cryogenic temperatures, and a cryogenic pump and piping connects a lower portion of the fuel storage tank to a fuel injector for injecting fuel directly into a combustion chamber of the first engine. Additional piping connects an upper portion of the fuel storage tank to a low pressure fuel injector for injecting the gaseous fuel into an intake air manifold or intake port associated with a combustion chamber of the second engine.

The present arrangement is particularly suitable for use in a larger vehicle such as a ship, a locomotive, or a large truck, such as an off-road mining truck

DETAILED DESCRIPTION OF PREFERRED EMBODIMENT(S)

The present two-engine vehicle system comprises a fuel injected, HPDI internal combustion engine for motive purposes, which is fuelled with a gaseous fuel that is stored onboard in liquefied form. A fuel supply system converts the stored liquefied gas to gaseous form and delivers it at injection pressure for injection directly into a combustion chamber of the HPDI internal combustion engine. For example, if the liquefied gaseous fuel is natural gas, the storage pressure at between about −130° C. and −160° C. is typically less than about 10 bar. Injection pressure for the HPDI internal combustion engine is typically at least 200 bar. In a typical system, the set point for the pressure relief valve can be about 17 bar (about 250 psi). With the present system, a separate, auxiliary fumigated internal combustion engine also fuelled with the gaseous fuel is employed to drive the cryogenic pump in the fuel supply system. The gaseous fuel can be delivered to the auxiliary fumigated internal combustion engine at a pressure that is typically about 5 bar, and generally less than 10 bar. Accordingly, while a cryogenic pump can be used to efficiently deliver the stored liquefied fuel to the HPDI engine, the storage pressure is too low for the BOG to be used by the HPDI engine without using a compressor which is much less efficient than a cryogenic pump. However, the storage pressure is conveniently sufficient for delivering the fuel to the auxiliary fumigated internal combustion engine, and the steady operation of the auxiliary engine helps to maintain the vapor pressure within the storage tank below the set point for the pressure relief valve. In this way, the present two-engine system makes efficient use of BOG from the cryogenic fuel storage tank. The auxiliary engine replaces prior art drives, such as more complicated and maintenance-prone hydraulic systems or electric drives (which are not preferred for conventional vehicles since large alternators are required to provide sufficient electrical power). Therefore the present two-engine system can result in system simplification and improved reliability overall. The present two-engine system is particularly suitable for use in a larger vehicle such as a ship, train locomotive, or a mining truck, if natural gas is the supplied fuel.

Figure 1:
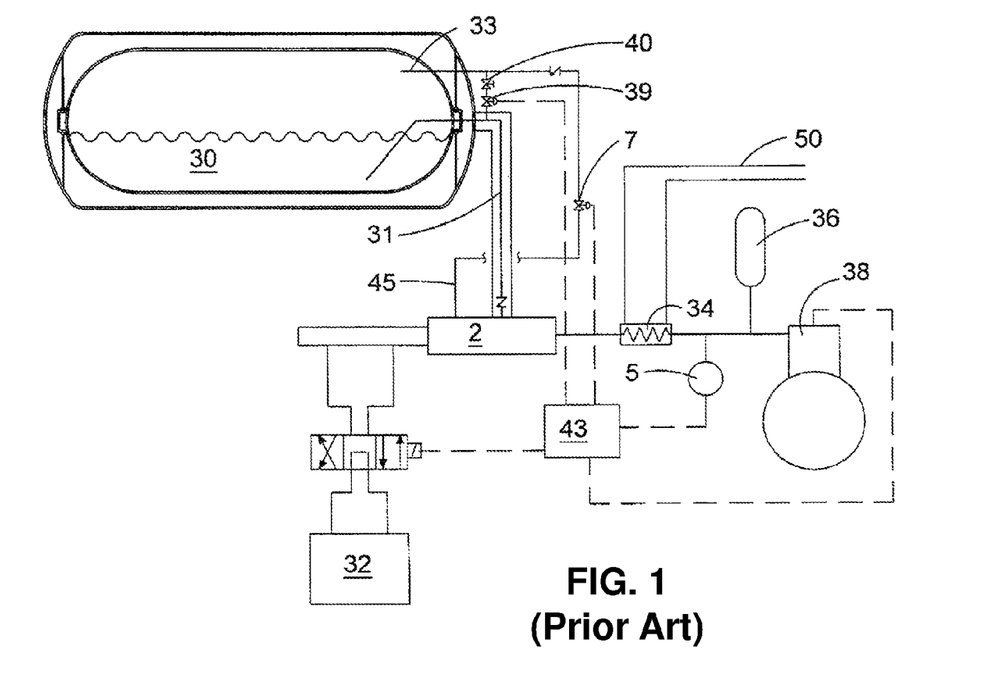
FIG. 1 (Prior Art) is a schematic diagram of a prior art single HPDI engine system with a gaseous fuel stored in liquefied form, with a cryogenic pump driven by a hydraulic motor that is mechanically driven by the engine. This type of system is similar to the system disclosed in U.S. Pat. No. 5,884,488.

For comparison, FIG. 1 shows a schematic diagram of a prior art single engine system for a vehicle that is fuelled with a gaseous fuel that is stored in liquefied form. The vehicle comprises cryogenic storage tank 30, hydraulic pump drive 32, cryogenic pump 2, vaporizer 34, accumulator 36 and direct injection internal combustion engine 38. Hydraulic pump 32 delivers hydraulic fluid to a cylinder that drives cryogenic pump 2. While no connection is shown in this schematic diagram between hydraulic pump 32 and engine 38, typically hydraulic pump 32 is mechanically coupled to engine 38, for example by a drive belt, whereby hydraulic pump 32 is mechanically driven by engine 38. A disadvantage of this arrangement is that there are inefficiencies introduced by energy losses associated with converting mechanical energy to hydraulic energy and then back to mechanical energy to drive cryogenic pump 2. With the belt drive between engine 38 and hydraulic pump 32 there are additional energy losses caused by the continuous coupling resulting in parasitic loads even when the cryogenic pump is idle.

With the prior art system shown in FIG. 1, during normal operation cryogenic pump 2 draws a mixture of vapor and liquid from storage tank 30. Thermally insulated suction line 31 is connected not only to the liquid phase region near the bottom of the tank, but also to the vapor phase region in the upper level of storage tank 30 through line 33. As more vapor is directed to cryogenic pump 2, the pumping efficiency and the mass flow rate discharged from the pump decreases, so solenoid valve 39 serves as a shut off valve to stop flow of vapor when a high mass flow rate is required, and metering valve 40 is operated to control the amount of vapor that is directed to cryogenic pump 2 when solenoid valve 39 is open. In this prior art system, cryogenic pump 2 is preferably a multi-stage pump that includes an inducer stage with a larger volume than the other stages for re-condensing vapor and means for returning excess fluid drawn into the pump when more liquid than vapor is being handled. The fluid discharged from cryogenic pump 2 is a supercritical fluid that is pumped to vaporizer 34, which is a heat exchanger that warms the supercritical fluid to vaporize it. The fuel that exits vaporizer 34 is stored in accumulator 36 as compressed natural gas. The accumulator makes a steady supply of gaseous fuel available to engine 38 at the desired injection pressure. Cryogenic pump 2 can be external to storage tank 30 or in other embodiments (not shown) it can be installed inside the storage tank. FIG. 1 also shows other pipes such as gas line 45, which is described in more detail in U.S. Pat. No. 5,884,488, but during normal operation solenoid valve 7 is normally closed. Gas line 45 relates to a feature for reducing the time needed to cool cryogenic pump 2 to its operating pressure. Heat for vaporizer 34 is generally obtained from coolant flowing through pipes 50, which are connected to the coolant system used to take heat from direct injection engine 38. Control for the various components in the fuel supply system is provided by programmed computer controller 43, and it issues commands through the signal wires shown by dashed lines. Controller 43 also receives data inputs from sensors that measure various system parameters and operator inputs so that controller 43 sends commands that are responsive to such inputs. In the shown simplified schematic, most of the command signal lines, sensors and operator inputs are not shown, but pressure sensor 5 is shown to be representative of sensor inputs. Pressure sensor 5 measures the pressure of the fuel so that controller 43 can determine when more fuel is needed and when to operate cryogenic pump 2.

Figure 2:
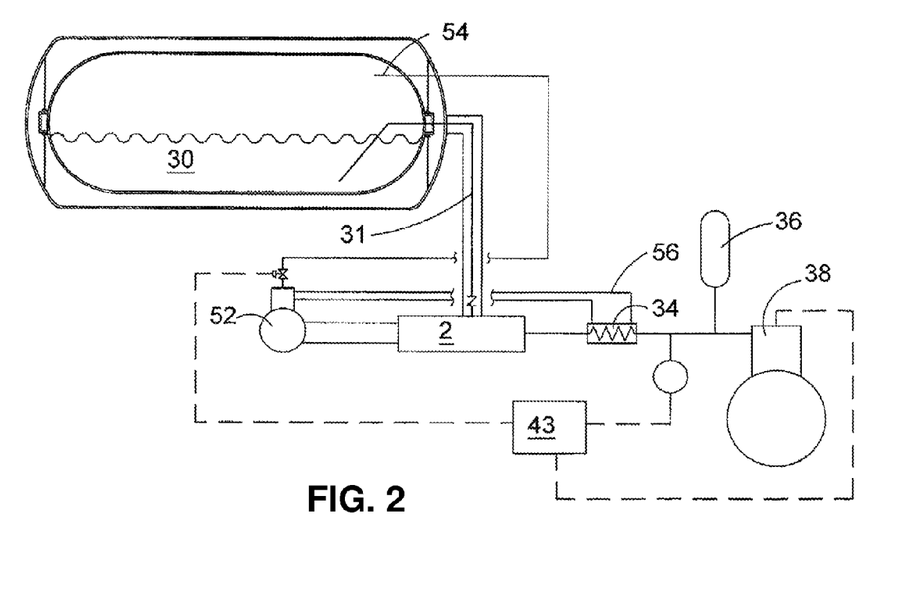
FIG. 2 is a schematic diagram of a two-engine system with a gaseous fuel stored in liquefied form, with a cryogenic pump driven by an auxiliary fumigated internal combustion engine that is fuelled with the gaseous fuel. The embodiment here comprises a coolant subsystem for the auxiliary fumigated engine which includes a cooling circuit in thermal communication with a vaporizer.

FIG. 2 is a schematic diagram of a two-engine system for a vehicle that is fuelled with a gaseous fuel that is stored onboard in liquefied form. To facilitate comparison with the system shown in FIG. 1, in FIG. 2 like elements are identified by like reference numbers. If a like-numbered element functions in substantially the same way as already described in relation to FIG. 1, to avoid repetition, unless helpful to the explanation of the system shown in FIG. 2, the description of like-numbered elements may not be repeated in the description of the system shown in FIG. 2.

Unlike the system shown in FIG. 1, which requires piping and valves to control the flow of vapor to cryogenic pump 2, which is preferably a multi-stage pump capable of efficiently handling mixtures of liquid and vapor, with means for returning excess fluid, the system shown in FIG. 2 has simpler piping and can use a simpler pump that is only required to handle liquid. In FIG. 2, engine 38 still functions as the main engine that provides the power for motive purposes and it is a direct injection HPDI internal combustion engine. However, engine 38 does not provide all of the power for this system, which also includes auxiliary fumigated internal combustion engine 52 that is used to power cryogenic pump 2, replacing the hydraulic pump that is employed by the prior art system shown in FIG. 1. FIG. 2, like FIG. 1, is a schematic representation and so the system elements are not drawn to scale. Auxiliary fumigated internal combustion engine 52 is preferably much smaller than HPDI internal combustion engine 38. This is because the power requirements for motive purposes are much greater than the power requirements for the cryogenic pump, which for some systems is on average no more than about 2 to 3% of the total power required by the system. It is also more advantageous for the HPDI internal combustion engine to be larger than the auxiliary fumigated engine because the fundamental differences between these types of engines enable the HPDI internal combustion engine to provide motive power to the vehicle more efficiently than the auxiliary fumigated engine.

In vehicle applications, the primary source of heat for vaporizer 34 can come from main direct injection engine 38 and can be exchanged using a suitable heat exchange subsystem (not shown). However, waste heat from auxiliary fumigated engine 52 can also desirably be used to vaporize fuel in vaporizer 34. FIG. 2 shows one option for accomplishing this using a coolant subsystem comprising cooling circuit 56. Here, heated coolant from auxiliary engine 52 is circulated by cooling circuit 56 to vaporizer 34 and back again once heat from the coolant is exchanged appropriately. This schematic diagram simply illustrates the transfer of heat from auxiliary fumigated engine 52 to vaporizer 54 via a coolant fluid passing though lines 56, but in a working embodiment the coolant piping would be part of a larger cooling system, that includes a pump for pumping the coolant fluid to cooling jackets associated with engines 52 and 38 and other devices that need cooling, for taking heat from them and transferring this heat to the vaporizer(s) and other devices that require heating, or to devices for dissipating excess heat. An advantage of the present system is that the heat generated by auxiliary fumigated engine 52 can be usefully employed by other devices such as vaporizer 34.

In FIG. 2, the use of auxiliary fumigated internal combustion engine 52 has the benefit of reducing or eliminating the need for hydraulic pump 32 and the high pressure hydraulic piping and valves required for driving cryogenic pump 2. Because the fuel delivered to auxiliary fumigated internal combustion engine through fuel line 54 is at relatively low pressure, as is the pressure of the engine coolant that is circulated through coolant line 56, and because fumigated engines are a mature technology that is known to be durable, the present system shown in FIG. 2 can be less expensive and more reliable than a high pressure hydraulic system, such as the one shown in FIG. 1.

In general, fumigated engines are less efficient than HPDI engines, with the present two-engine system that uses a larger HPDI engine combined with a fumigated engine, the effect on overall system efficiency is not based solely on the difference in efficiency between the HPDI engine and the fumigated engine. In larger vehicles, such as locomotives, ships and large off-road trucks for mining applications, it can be advantageous to have an auxiliary power unit that is more efficient to run than the larger main engine for lighter loads. In the present two-engine system there are some specific advantages that result from combining an HPDI engine as the main engine with a fumigated engine as the auxiliary engine, particularly when the fuel is a gaseous fuel that is stored on board in a liquefied form. In the present system some of these advantages are also factors that offset the lower efficiency of the fumigated engine. Some of these advantages and factors include: (a) the fumigated engine's power contribution to the overall system being relatively small, thereby limiting the effect of the fumigated engine's lower efficiency; (b) the elimination of the hydraulic drive for the cryogenic pump and the energy losses associated with conversion of mechanical energy from the main engine, to hydraulic energy in the hydraulic drive, and then back to mechanical energy in the cryogenic pump; (c) reductions in energy lost on account of wasted BOG that might otherwise be vented from the storage tank; (d) reduced maintenance costs associated with a simpler system, specifically the fumigated engine versus the hydraulic drive, and a liquid-only cryogenic pump versus one that can handle both liquid and vapor; and (e) performance benefits gained by using heat recovered from the auxiliary engine to improve the performance and efficiency of vaporizer 34.

In this system, cryogenic storage tank 30 is designed to hold the liquefied gaseous fuel at a pressure that allows the BOG to have a pressure that is high enough to be used by auxiliary fumigated internal combustion engine 52. With storage tanks such as this the set point for triggering the pressure relief device can be set at around 17 bar. Different from a single engine system such as the one shown in FIG. 1, where it can be more desirable to store the fuel at the lowest practical pressure, for example less than 5 bar, to reduce the likelihood of venting boil-off gas to atmosphere, with the system shown in FIG. 2, it can be more desirable to maintain the vapor pressure near the upper end of the normal storage pressure range, for example about 10 bar, because the steady use of vapor by the auxiliary engine reduces the likelihood of the storage pressure rising to the set point for the pressure relief valve. In some embodiments it can be desirable to design the storage tank with a higher pressure rating, accepting some extra weight in exchange, to allow higher storage pressures and a higher set point for the pressure relief valve. However, the upper limit of the normal operational pressure inside storage tank 30 is preferably kept below the normal saturation pressure of the fuel in the re-fuelling stations, in order to reduce venting from the on board storage tank before re-filling it. In addition, it is preferable to design the auxiliary fumigated engine to be operable with a low fuel supply pressure to adequately fuel the engine at start-up. Furthermore, in some embodiments a pressure building circuit can also be employed. For simplicity of illustrating the present system, FIG. 2 does not show all of the pressure regulators or simple pressure building circuits, or a simple low pressure pump, which can be employed in different embodiments of the present system. Such pressure building circuits are known, since fumigated engines are well known in single engine systems. In addition, should the BOG prove too cold for immediate use by engine 52, a suitable heat exchange apparatus can be employed to warm it up as necessary. Again, such hardware is well known to those familiar with single engine systems.

Vaporizer 34 is normally located close to cryogenic pump 2. In another embodiment (not shown), because auxiliary fumigated engine 52 is relatively small, it can be located in thermal contact with vaporizer 34 so that there is conductive heat transfer from the engine to the vaporizer, which can be in addition to coolant circulated to vaporizer 34 from one or both engines. Note that contrary to conventional thinking, it can be advantageous to a certain extent for engine 52 to be less efficient in order that additional waste heat is available for vaporizer 34.

Figure 3:
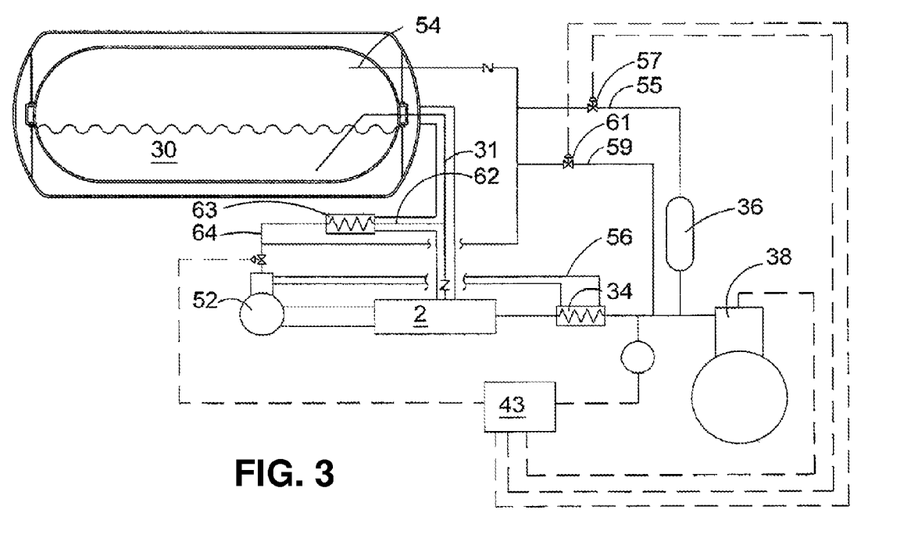
FIG. 3 is a schematic diagram of a two-engine system with a gaseous fuel stored in liquefied form, with a cryogenic pump driven by an auxiliary fumigated internal combustion engine that is fuelled with the gaseous fuel. The shown embodiment illustrates several options for supplementing the fuel supplied to the auxiliary fumigated engine; either from the accumulator or the high pressure vaporizer or from a second low pressure vaporizer.

BOG may not be available in sufficient quantities to meet the needs required for auxiliary fumigated internal combustion engine 52 to power cryogenic pump 2 and other extra devices that it is also employed to power. For illustrative purposes, the embodiment in FIG. 3 shows several different options for supplementing the fuel supplied to the auxiliary fumigated engine, but a working embodiment need only employ one option. One option is to provide supplementary low pressure fuel via line 55 which can be connected to accumulator 36. Pressure reducing valve 57 reduces the pressure to the lower pressure that is required for delivery to fumigated auxiliary internal combustion engine 52. Note that the one-way check valve on fuel line 54 is oriented in a position that is reversed from that of the check valve on line 33 in FIG. 1. As shown in the embodiment of FIG. 2, the check valve prevents fuel from flowing back into storage tank 30. Supplementary low pressure fuel line 55 need not be connected to accumulator 36 and could be connected at a location along the high pressure fuel line between vaporizer 34 and HPDI internal combustion engine 38, for example, it could be connected to near the outlet of vaporizer as shown by line 59 and pressure reducing valve 61. However, fuel for auxiliary fumigated internal combustion engine is preferably delivered from the BOG when there is sufficient vapor pressure in storage tank 30 because this reduces the need for venting and there is some inefficiency associated with pumping the gaseous fuel to a high pressure (as needed for injection into HPDI engine 38) and then reducing its pressure for delivery to the pressure needed for fumigated engine 52.

Yet another option shown in FIG. 3 is to provide low pressure fuel line 62 which is in fluid communication with the liquid portion of storage tank 30 to second vaporizer 63 to produce vaporized fuel at a pressure that is immediately useable by engine 52. When using two vaporizers like this, in some embodiments it can be advantageous to run their respective heat exchange coils through a common heat exchange jacket (not shown), thereby integrating the two with each other and reducing the amount of piping for the coolant.

Auxiliary fumigated engine 52 can be a simple throttled, spark ignited engine, sized for powering cryogenic pump 2. The drive connection to pump 2 can include speed reduction or variation facility and can typically be mechanical but could also be hydraulic. (If a hydraulic connection is used, it is one that is self-contained, comprising a fluid reservoir, pump, and controls in an integrated unit, and thus still obtaining certain efficiency benefits by using the present two-engine system) In addition, auxiliary fumigated engine 52 can be the power supply for one or more additional auxiliary devices in the vehicle, such as gas detection systems, an electrical generator, air conditioning units, water/coolant pumps, and similar auxiliary devices (not shown).

Yet another advantage of the system shown in FIG. 2 is that because auxiliary fumigated engine 52 is independent of main direct injection HPDI engine 38, auxiliary fumigated engine 52 can be used to drive cryogenic pump 2 only when needed, and the speed of auxiliary fumigated engine 52 can be regulated according to the fuel demand from direct injection HPDI engine 38. With the system shown in FIG. 1, if hydraulic drive 32 is mechanically driven by direct injection HPDI engine 38, the loading and fuelling requirements for main HPDI engine 8 may not always be matched to the speed. That is, depending upon the engine transmission and which gear is selected, there can be different engine loads for the same speed. Accordingly, there can be some inefficiency in this regard associated with the single engine system shown in FIG. 1.

During vehicle startup, fumigated engine 52 can be started first and operated so as to warm the engine coolant for delivery to vaporizer 34 and to power the cryogenic pump to draw liquefied gas in to pre-cool it prior to delivering higher flow rates to main HPDI engine 38.

Compared to a single engine system, the presently present two-engine system requires an additional fumigated engine and other associated hardware. While this might normally lead persons familiar with the technology involved here to dismiss such a system for being overly complex and inefficient, this is not necessarily the case as described herein. There can be numerous advantages to the present system and the embodiments disclosed herein. It can be difficult to package an engine driven hydraulic pump on the main motive engine, and a large reservoir is typically needed for the hydraulic fluid. Further, a large number of hydraulic fluid hoses are typically required to connect between hydraulic pump 32, which should to be near engine 38, and cryogenic pump 2, which is preferably located near the fuel storage tank(s). Indeed, it can be difficult to route, protect and support the hydraulic fluid hoses in certain applications (for example, mine haul trucks and locomotives). If multiple small LNG cryogenic pumps are used in the vehicle, there would be a corresponding need for many more hydraulic fluid hoses. In addition, prior art hydraulically actuated cryogenic pumps operate at a high cycle rate that can result in the need for regular service and maintenance, adding to the operational costs in terms of maintenance and vehicle down time.

Another advantage of the present system is that the auxiliary engine, cryogenic pump and vaporizer, can be packaged as a module that can be re-used and easily replaced.

EXAMPLE

The following illustrative example demonstrates a potential improvement in parasitic power as a result of using the disclosed system. However, this example should not be construed as limiting. Based on scaling up system performance of a reciprocating hydraulically actuated cryogenic pump, the projected parasitic power for a vehicle using a 4900 W engine is about 115 KW or 2.3%. However, based on the work done on the cryogenic fluid and typical efficiencies of mechanical drives, the projected parasitic power for the same vehicle employing an additional fumigated engine of similar efficiency in place of the hydraulic drive is about 0.8%. If the smaller auxiliary fumigated engine had a lower efficiency (in particular, 30% brake thermal efficiency compared to 40% for the main HPDI engine of the vehicle), the projected parasitic fuel flow would be 1.2% of the direct injection flow.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A gaseous fuelled two-engine system comprising:
   (a) a storage tank that is thermally insulated for holding a gaseous fuel in liquefied form;
   (b) a first outlet associated with a lower portion of said storage tank for delivering said gaseous fuel in liquefied form;
   (c) a second outlet associated with an upper portion of said storage tank for delivering said gaseous fuel in vaporized form;
   (d) a cryogenic pump comprising a suction inlet fluidly connected to said first outlet;
   (e) a drive for said cryogenic pump comprising a power supply;
   (f) a vaporizer having a fuel inlet fluidly connected to a discharge outlet of said cryogenic pump;
   (g) a first engine that is a direct injection gaseous-fuelled internal combustion engine comprising a fuel injector for injecting said gaseous fuel directly into a combustion chamber at pressures greater than 200 bar, said fuel injector receiving said gaseous fuel through a pipe that is in fluid communication with a vaporizer fuel outlet; and
   (h) a second engine that is a fumigated gaseous-fuelled internal combustion engine comprising a fuel injector for injecting said gaseous fuel into an intake air manifold that delivers intake air to a combustion chamber of said second engine, wherein said gaseous fuel that is supplied to said second engine is delivered through a pipe that is in fluid communication with said second outlet, and wherein said second engine is said power supply for said cryogenic pump drive.

2. The gaseous fuelled two-engine system of claim 1, wherein said second engine comprises a throttle in an intake air passage and a spark plug in said combustion chamber to trigger ignition of said gaseous fuel.

3. The gaseous fuelled two-engine system of claim 1, wherein said system is mounted on a vehicle with said first engine being a primary source of motive power to said vehicle.

4. The gaseous fuelled two-engine system of claim 1, wherein said second engine is also a power supply for at least one other auxiliary device selected from the group consisting of electrical generators, air conditioners, refrigeration equipment and hydraulic drives.

5. The gaseous fuelled two-engine system of claim 1, further comprising an accumulator in fluid communication with said vaporizer outlet for storing vaporized gas.

6. The gaseous fuelled two-engine system of claim 5, further comprising a pipe and a pressure reducing valve associated therewith for directing a portion of said gaseous fuel from said accumulator to said second engine.

7. The gaseous fuelled two-engine system of claim 1, further comprising a pipe and a pressure reducing valve associated therewith for directing a portion of said gaseous fuel from said vaporizer outlet to said second engine.

8. The gaseous fuelled two-engine system of claim 1, further comprising a second vaporizer, said second vaporizer comprising an inlet in direct fluid communication with said lower portion of said storage tank and an outlet fluidly connected to supply gaseous fuel to said second engine.

9. The gaseous fuelled two-engine system of claim 1, wherein said second engine is located in thermal contact with said vaporizer.

10. The gaseous fuelled two-engine system of claim 1, wherein said gaseous fuel is natural gas.

11. The gaseous fuelled two-engine system of claim 1, further comprising a coolant subsystem for said second engine, said coolant subsystem comprising a cooling circuit in thermal communication with said vaporizer.

12. A vehicle comprising the gaseous fuelled two-engine system of claim 1.

13. The vehicle of claim 12, wherein said vehicle is one of a ship, a locomotive and a truck.

14. A method of supplying a gaseous fuel in said gaseous fuelled two-engine system of claim 1, the method comprising:
   (a) fuelling said second engine with vaporized fuel from said storage tank;
   (b) driving said cryogenic pump with power supplied by said second engine; vaporizing said fuel in said vaporizer; and
   (c) fuelling said first engine with vaporized fuel pumped from said storage tank from said cryogenic pump.

15. The method of claim 14, further comprising supplementally fueling said second engine with said gaseous fuel pumped from said storage tank by said cryogenic pump.

16. The method of claim 14, further comprising heating said vaporizer with heat generated by said second engine.

17. The method of claim 16, wherein said second engine is located in thermal contact with said vaporizer whereby heat generated by said second engine is transferred to said vaporizer by conduction.

18. The method of claim 14, further comprising regulating the speed of said second engine according to demand for said gaseous fuel from said gaseous fuelled two-engine system.

19. A vehicle powered by a gaseous fuelled two-engine system comprising:
   (a) a first engine that is a high pressure direct injection internal combustion engine that provides on average at least 90% of the total power output of said system when said vehicle is moving;
   (b) a second engine that is a fumigated internal combustion engine providing, on average, no more than 10% of the total power output of said system when said vehicle is moving;
   (c) a fuel storage tank that stores a gaseous fuel in liquefied form at cryogenic temperatures;
   (d) a cryogenic pump and piping connecting a lower portion of said fuel storage tank to a fuel injector for injecting fuel directly into a combustion chamber of said first engine;
   (e) piping connecting an upper portion of said fuel storage tank to a low pressure fuel injector for injecting said gaseous fuel into an intake air manifold or intake port associated with a combustion chamber of said second engine.

20. The vehicle of claim 19, wherein said vehicle is one of a ship, a locomotive and a truck.

* * * * *